(12) United States Patent
Park (10) Patent No.: US 6,439,420 B1
(45) Date of Patent: Aug. 27, 2002

(54) DETACHABLE HANDLE FOR COOKING UTENSIL

(76) Inventor: Jong Peter Park, 1830 Summitridge Dr., Diamond Bar, CA (US) 91786-4336

( * ) Notice: Subject to any disclaimer, the term of this patent is extended or adjusted under 35 U.S.C. 154(b) by 0 days.

(21) Appl. No.: 09/823,436

(22) Filed: Mar. 29, 2001

(51) Int. Cl.⁷ .............................................. A47J 45/00
(52) U.S. Cl. ........................... 220/759; 16/425; 294/34
(58) Field of Search ................................ 220/755, 759; 16/425; 294/34, 31.1

(56) References Cited

U.S. PATENT DOCUMENTS

| | | | | |
|---|---|---|---|---|
| 3,306,648 A | * | 2/1967 | Serio ........................... | 220/759 |
| 3,342,517 A | * | 9/1967 | Pryce ........................... | 220/759 |
| 3,438,082 A | * | 4/1969 | Jones et al. ................. | 220/759 |
| 3,474,486 A | * | 10/1969 | Morris et al. ................ | 220/759 |
| 3,616,964 A | * | 11/1971 | Yamanki ..................... | 220/759 |
| 3,648,887 A | * | 3/1972 | Hartley ........................ | 220/759 |
| 3,798,706 A | * | 3/1974 | Wolfson et al. ............. | 220/759 |
| 3,883,169 A | * | 5/1975 | Fischbach ................... | 220/759 |
| 3,934,748 A | * | 1/1976 | Racz ........................... | 220/759 |
| 4,083,081 A | * | 4/1978 | Witte ........................... | 220/759 |
| 4,206,853 A | * | 6/1980 | Iten et al. .................... | 220/759 |
| 5,704,092 A | * | 1/1998 | Nicollet et al. ............. | 220/759 |
| 6,173,860 B1 | * | 1/2001 | Lamers ....................... | 220/759 |

* cited by examiner

*Primary Examiner*—Joseph M. Moy
(74) *Attorney, Agent, or Firm*—Lee & Hong (57) ABSTRACT

A detachable handle for a container having an upper rim comprises a body having a front portion and including: a pressure pump actuated with a first control button, wherein the pressure pump includes a first piston and contains viscous fluid, preferably oil; a control valve chamber in fluid communication with the pressure pump through a first fluid path, the control valve chamber including a control valve being actuated with a second control button; a pressure cylinder in fluid communication with the control valve chamber through a second fluid path, wherein the pressure cylinder includes a second piston; and an actuating assembly connected to the second piston. The actuating assembly includes a hook extending out of the body for engaging the upper rim of the container.

20 Claims, 6 Drawing Sheets

DETACHABLE HANDLE FOR COOKING UTENSIL

BACKGROUND OF THE INVENTION

1. Field of the Invention

The present invention relates to a handle for a cooking utensil, such as pot or pan, and more particularly, to a handle removably attached to the cooking utensil.

2. Discussion of the Related Art

Conventional cooking utensils, such as pots and pans, are well known and used in a kitchen. Although, such cooking utensils are most frequently used during cooking, other types of cooking utensils are not frequently used and usually are stored for a long period of time between uses. In addition, pots and pans require a larger storage space in the kitchen.

Generally, pots and frying pans are made with handles that are securely and permanently fixed to the outer bodies by such methods as welding or screw joints. The conventional cooking utensils have a handle(s) fixed to a body of the cooker, which makes it unsuitable for use in an oven for cooking or for placement on a table for serving after the completion of the cooking. Moreover, the cooker of the related art is inconvenient for cleaning or storage and transportation because of its fixed handle.

Pots and pans with detachable handles require less space, as the handles may be removed and placed inside the pots or pans, thereby enabling the pots and pans to be stored closer together. Many prior art detachable handles include a pair of opposing, tong-like members which grip the upper rim of a pot or pan. Because the upper rim is generally not very wide, the detachable handle has only a small surface area with which to grasp, making it difficult for the handle to attach securely to the pan. As a result, the connection between the handle and the pan is unstable.

Several ideas have been proposed to solve these problems and inconveniences by constructing a handle that can be coupled with or separated from the cooker. One of the ideas is taught in Korean Utility Laid-Open No. 2000-0013999 which was published on Jul. 15, 2000.

Figure 6:
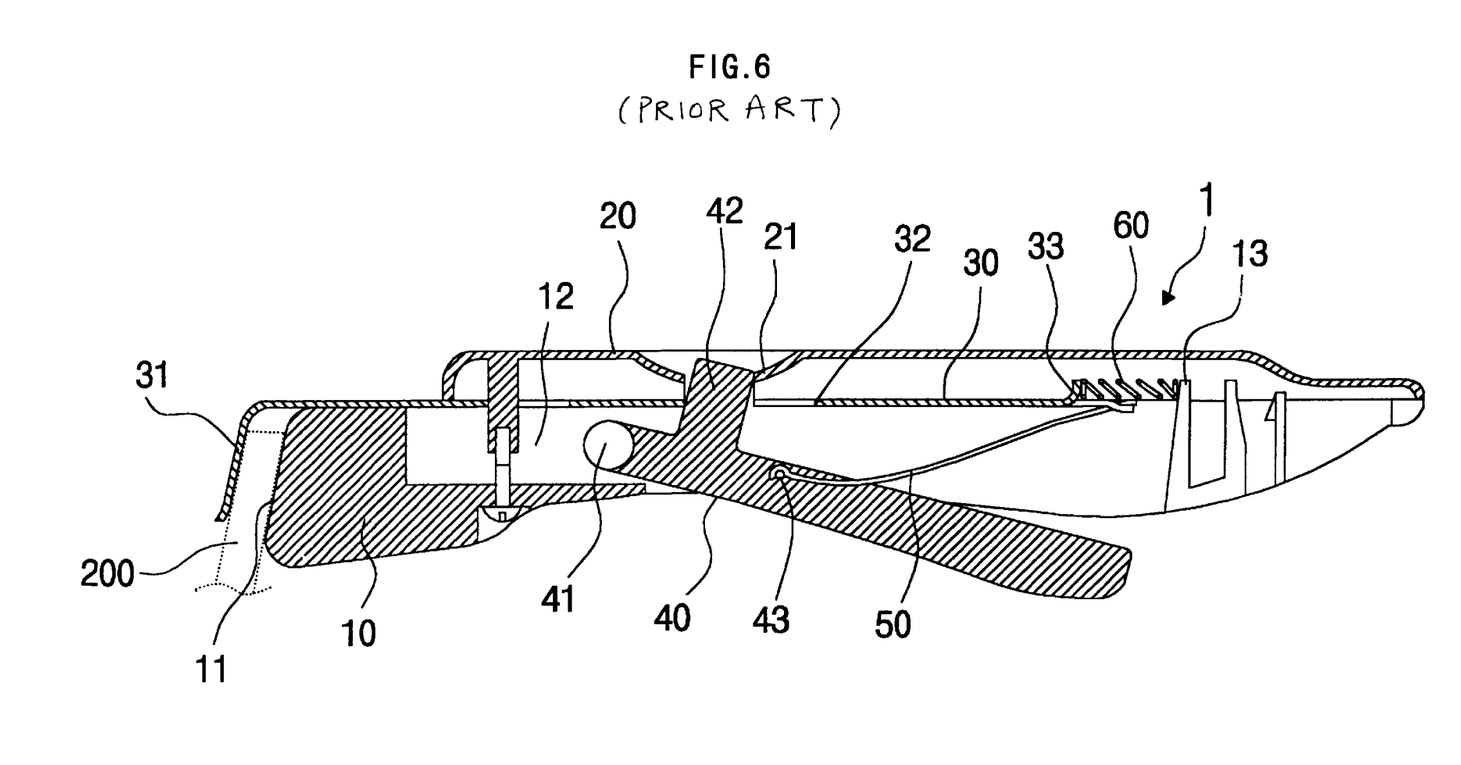
FIG. 6 illustrates a cross-sectional view of a conventional detachable handle.

The detachable handle for a cooker published in the above laid-open is shown in FIG. 6 of the present application and the operation of the separable handle is as follows. When a push button 42 of an operation bar 40 that protrudes out of a handle cover 20 is depressed, the operation bar 40 overcomes the force of a spring 60 (working through a keeper 50) and pivots downwardly by using an axis pin 41 as a rotation point.

From a timing standpoint, from the point which the operation bar 40 starts to rotate downwardly, the force of the spring 60 working on the operation bar 40 through the keeper 50 acts to push the operation bar 40 downward. As a result, the rear portion of the operation bar 40 protrudes out of the lower portion of the handle body 10.

In accordance with the downward rotating operation of the operation bar 40, the keeper 50, which is coupled between a bump on the operation bar 40 and the rear end of an operation plate 30, moves the entire operation plate 30 forward. This leaves a proper interval between the handle arm 31 at the front end of the operation plate 30 and the front end 11 of the handle body 10.

By maintaining the above-mentioned state, the operation bar 40, which protrudes out to the bottom of the handle body 10, and the handle body 10 are squeezed together with hand upon placing the rim of a cooking vessel 200 between the handle arm 31 and the front end 11 of the handle body 10. Due to the squeezing pressure, the operation bar 40 pivots upward into the handle body 10. Such motion causes the keeper 50 to rearwardly pull the operation plate 30. As a result, the upper rim of the cooking vessel 200 is securely held between the handle arm 31 and the front end of the handle body 10.

The handle 1 according to prior art is detached from the cooking vessel 200 by pushing the push button 42 of the handle 1. One disadvantage of the handle 1 according to prior art shown in FIG. 6 is it fails to securely hold the cooking vessel 200 due to the weakness of the keeper 50 pulling the handle arm 31.

In light of the foregoing, it is desirable to provide a compact detachable handle which may be easily attached to and removed from a cooking utensil and which does not interfere with the cooking utensil's contents.

SUMMARY OF THE INVENTION

Accordingly, the present invention is directed to a separable handle of a cooker that substantially solves one or more of the problems, limitations, and disadvantages of the related art.

An object of the present invention is to provide a handle structure which can be separated from a cooker by securing a strong force to hold the cooker with the handle.

Additional features and advantages of the invention will be set forth in the description which follows and in part will be apparent from the description, or may be learned through practice of the invention. The objectives and other advantages of the invention will be realized and attained by the structures particularly pointed out in the written description and claims hereof as well as the appended drawings.

To achieve these and other advantages and in accordance with the purpose of the present invention, as embodied and broadly described, the detachable handle for a container having an upper rim comprises a body having a front portion and including: a pressure pump actuated with a first control button, wherein the pressure pump includes a first piston and contains viscous fluid, preferably oil; a control valve chamber in fluid communication with the pressure pump through a first fluid path, the control valve chamber including a control valve being actuated with a second control button; a pressure cylinder in fluid communication with the control valve chamber through a second fluid path, wherein the pressure cylinder includes a second piston; and an actuating assembly connected to the second piston. The actuating assembly includes a hook extending out of the body for engaging the upper rim of the container.

According to one aspect of the present invention, when the first control button is depressed, the viscous fluid is transferred from the pressure pump to the control valve chamber through the first fluid path and into the pressure cylinder through the second fluid path. When the second control button is depressed, the viscous fluid is transferred from the pressure cylinder to the control valve chamber through the second fluid path and to the pressure pump through the first fluid path.

According to another aspect of the present invention, a first spring is disposed inside the control valve chamber to bias the control valve to block the flow of the viscous fluid from being transferred from the control valve chamber to the pressure pump. In addition, a second spring is disposed inside the pressure cylinder to bias the actuating assembly connected to the second piston to disengage the container.

According to another aspect of the present invention, the front portion of the handle has a step-like configuration for receiving therein a flange of the container. Preferably, the front portion of the handle is at least partially covered with a support plate to prevent erosion after a prolonged use.

According to another aspect of the present invention, the pressure cylinder is laterally disposed within the handle so that the second piston moves laterally to allow the hook to move forward and backward with respect to the handle. Moreover, the pressure pump is longitudinally disposed within the handle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate the embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
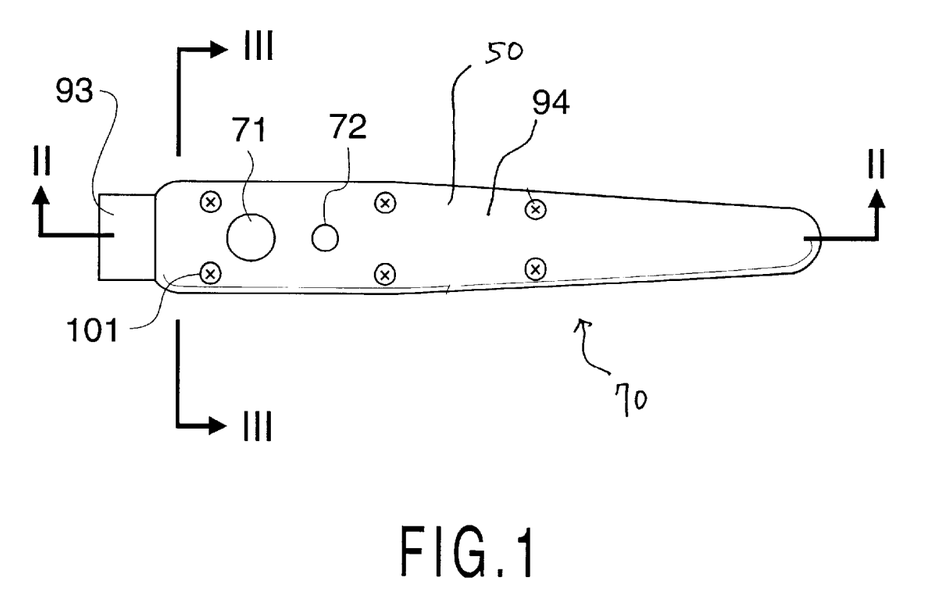
FIG. 1 illustrates a top plan view of a detachable handle according to a preferred embodiment of the present invention.

A detachable handle 70 according to the preferred embodiment of the present invention is illustrated with respect to FIGS. 1 to 5. Referring to FIG. 1, the detachable handle 70 includes an elongated body 50 that functions as a handle, and an L-shaped hook 93 protruding from a front end of the body 50. The detachable handle 70 has a pair of actuating buttons, namely, a coupling button 71 and a releasing button 72. In order to attach and detach the detachable handle 70 to an upper rim of a cooking utensil, such as pots and pans, the coupling button 71 and the release button 72 are respectively used. Preferably, the hook 93 and the connecting plate 92 are integrally attached together and moves as a single piece.

Figure 2A:
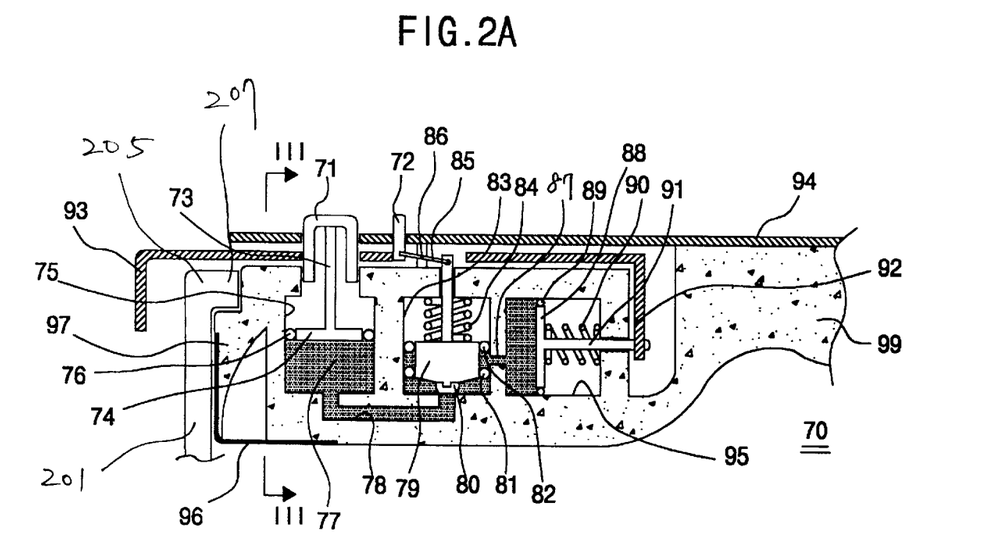
FIGS. 2A and 2B illustrate cross-sectional views of the detachable handle along line II—II in FIG. 1.
Figure 2B:
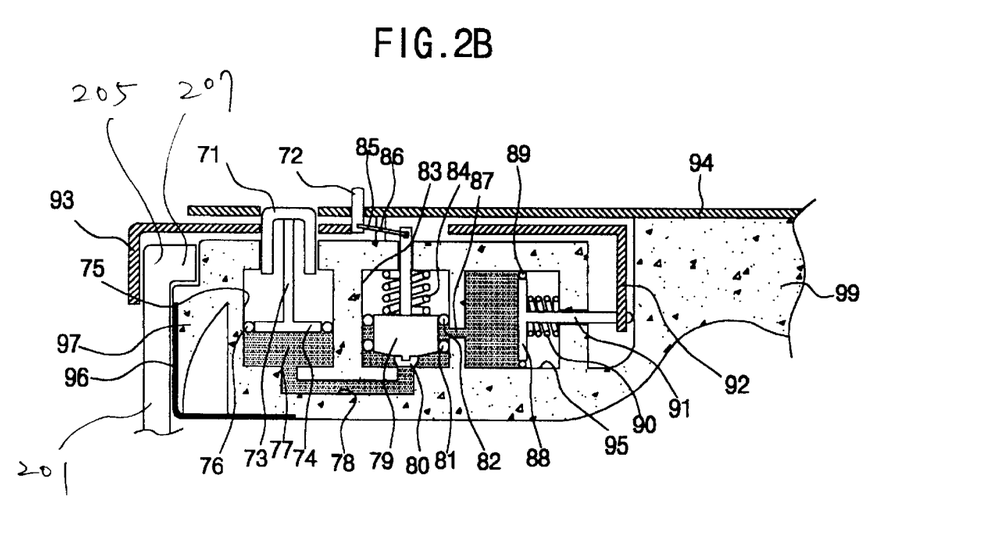
Figure 3:
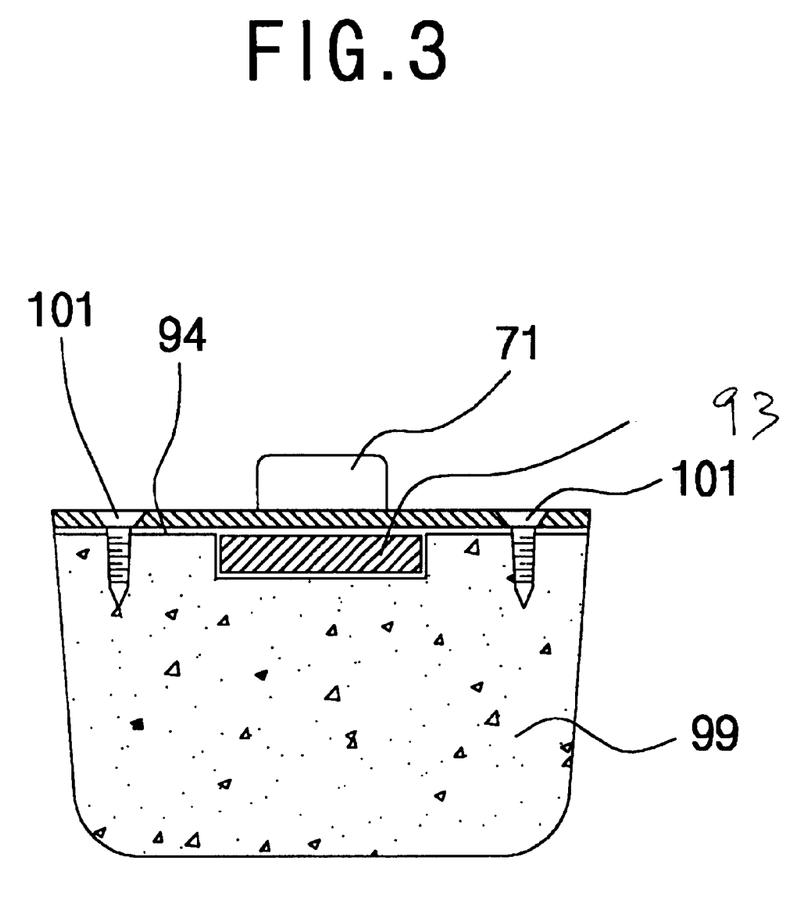
FIG. 3 illustrates a cross-sectional view of the detachable handle along line III—III in FIG. 1.

FIGS. 2A and 2B illustrate cross-sectional views of the detachable handle 70 along line II—II in FIG. 1. Similarly, FIG. 3 illustrates a cross-sectional view of the detachable handle along line II—II in FIG. 1. The engagement of the detachable handle 70 illustrated in FIGS. 4 and 5.

Referring to FIGS. 2A and 2B, the detachable handle 70 according to the present invention has various internal components and chambers to allow itself to be removably attached to a cooking utensil. Preferably, the detachable handle 70 includes an oil pressure pump 75, an oil pressure cylinder 95, a control valve chamber 83 for opening and closing a first oil path 78 disposed between the oil pressure pump 75 and the oil pressure cylinder 95, and an actuator assembly for engaging the upper rim of a cooking utensil 200. In the preferred embodiment, the actuator assembly includes a connecting plate 92 and a hook 93.

Although the present invention is described using oil has pressure conveying substance placed in various chambers, other viscous materials known to one of ordinary skill in the art may also be substituted, such as hydrolic fluid.

According to FIGS. 2A and 2B, the coupling button 71 is coupled to a piston rod 73 of the oil pressure pump 75. When the coupling button 71 is depressed, the oil 77 in the oil pressure pump 75 egresses through a first oil path 78.

A piston 88 of the oil pressure cylinder 95 accomplishes its stroke by receiving oil pressure generated from the oil pressure pump 75 through a second oil path 87 located at the bottom of the oil pressure cylinder 95. The actuator assembly which comprises the connecting plate 92 and the hook 93 is connected to a piston rod 91 of the piston 88.

In the preferred embodiment, the connecting plate 92 is coupled to the piston rod 91. The hook 93 of the actuator assembly moves to the direction toward the front of the handle body 99 provided that the piston rod 91 is pushed by oil pressure. A spring 90 is disposed around the piston rod 91 of the piston 88 of the oil pressure cylinder 95 to bias the hook 93 of the actuator assembly to disengage the upper rim 205 of the cooking utensil. Preferably, there is provided an O-ring 89 around the circumference of the piston 88 to enhance sealing.

The control valve chamber 83 includes a control valve 80 blocking the first oil path 78 in the control valve chamber 83, and a valve stem 79 to which the control valve 80 is attached. The control valve 80 opens or closes the first oil path 78 transferring the oil out of the oil pressure pump 75 to the oil pressure cylinder 95. Once the pressure in the oil pressure pump 75 is greater than that of the oil pressure cylinder 95, the control valve 80 of the control valve chamber 83 is opened. The control valve chamber 83 also includes a pair of O-rings 81 and 82 placed around a circumference of the valve stem 79, and a valve spring 84 biasing the valve stem 79 toward the opening of the oil path 78 to force the control valve 80 to close the first oil path 78.

In the preferred embodiment, the valve stem 79 is coupled, for example using a pin, to an end of a lever 85. The lever 85 is pivotally connected to a base using a second pin 86. The other end of the lever 85 is coupled with the releasing button 72 using a third pin or other method known to one of ordinary skill in the art. Normally, due to the biasing force of the valve spring 84, the control valve 80 normally blocks the first oil path 78 to prevent the flow of oil 77 into the control valve chamber 83.

Referring to FIGS. 1 to 3, a cover 94 of the handle 70 has a plurality of holes to allow the coupling and releasing buttons 71 and 72 to protrude therefrom. Preferably, the cover 94 is coupled to the lower body 99 of the handle 70 using fasteners, such as screws 101.

In the preferred embodiment, an L-shaped support plate 96 is attached to the front portion 97 of the lower body 99 to prevent wearing or erosion due to frequent contacts with the cooking utensil. In this regard, the support plate 96 is preferably made of a rigid material, such as stainless steel, to provide additional support when the front portion 97 of the detachable handle 70 is pushed against the outer wall of the cooking utensil 200 during lifting. The support place 96 and the front portion 97 of the detachable handle 70 is convexly shaped, preferably in a shape of an outer-curvature of a cooking utensil, in order to provide an accurate and tight fitting of the handle 70 against the upper rim 205 of the cooking utensil 200. For example, as shown in FIGS. 2A and 2B, if the upper rim 205 of the cooking utensil 200 has a flange 207, the front portion 97 of the detachable handle 70 may be prepared to have a step-like receptacle. Alternatively, the shape of the front portion 97 of the detachable handle 70 is a design choice depending on the shape and form of the upper rim of a cooking utensil. Therefore, the shape of the front portion 97 is not to be limited to the specific forms shown or described herein.

Figure 4:
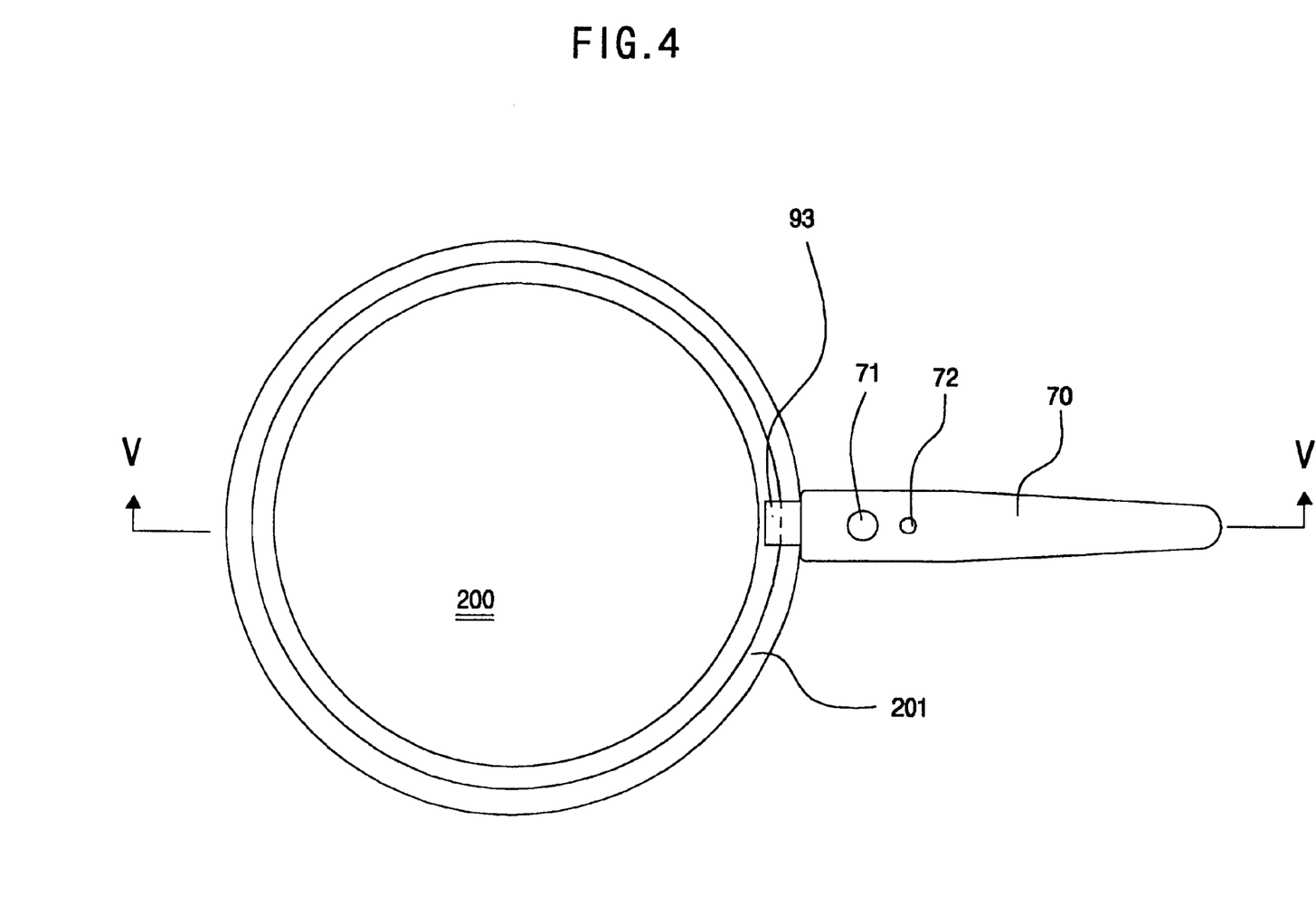
FIG. 4 illustrates the detachable handle attached to a cooking utensil.
Figure 5:
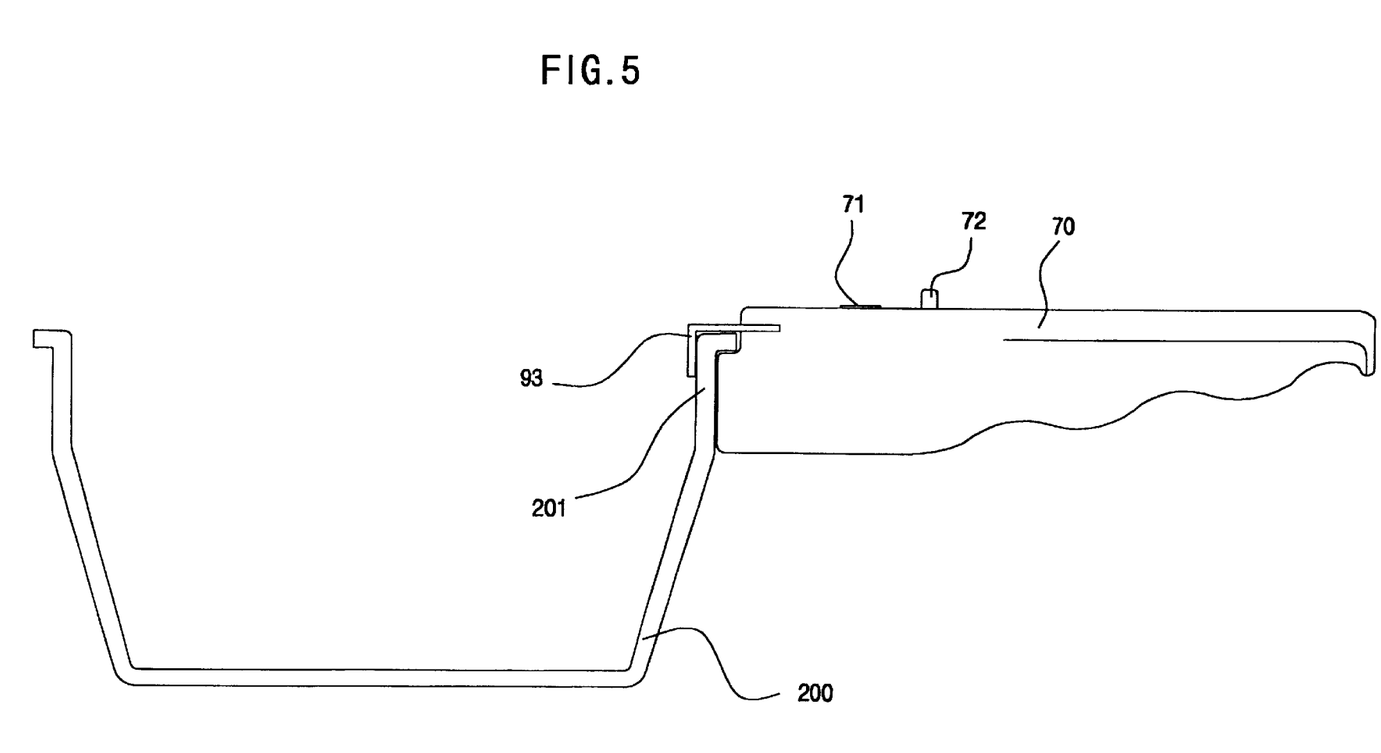
FIG. 5 illustrates a cross-sectional view of the detachable handle attached to a cooking utensil along line V—V in FIG. 4.

The operation of the detachable handle 70 according to the preferred embodiment will be described using FIGS. 2A and 2B as illutrations. First, a user places the detachable handle 70 against a side wall 201 of the cooking utensil as shown in FIGS. 4 and 5. Referring to FIGS. 2A and 2B, when the flange 207 of the upper rim 205 engages the step-like receptacle formed by the front portion 97 of the handle 70, the user depresses the coupling button 71.

Through such action of the user, the oil pressure in the oil pressure pump 75 is increased by the depressing motion of the piston 74. As a result, the oil 77, due to its viscosity, is forced out of the oil presure pump 75 through the first oil path 78. Such force is exerted against the control valve 80 and the valve stem 79 of the control valve chamber 83. The control valve 80 is pushed upward despite the biasing force of the valve spring 84. Preferably, there is provided an O-ring 76 around the circumference of the piston 88 to enhance sealing.

As the first and the second oil paths 78 and 87 are in fluid communication with each other, the oil 77 from the oil pressure pump 75 is transferred to the oil pressure cylinder 95. As more oil 77 is pushed into the oil pressure cylinder 95, the pressure is increased which in turn pushes the piston 88 of the oil pressure cylinder 95. The piston 88 pushes the piston rod 91 out of the oil pressure cylinder 95. The rearward movement of the piston rod 91 pushes the connecting plate 92 and the hook 93, thus allowing the hook 93 to securely engage the upper rim 205 of the cooking utensil 200.

In this case, the coupling force transferred to the hook 93 of the detachable handle 70 is several times greater than that of the force applied to the coupling button 71. The coupling force may be amplified by adjusting the cross-sectional size of the piston 74 used in the oil pressure pump 75. In particular, as a larger cross-sectional sized piston 74 is used, the coupling force transferred to the hook 93 becomes greater.

Once the coupling buttom 71 is fully depressed, the oil 77 no longer flows through the first and the oil paths 78 and 87. As a result, the valve stem 79 and the control valve 80 connected thereto closes the first oil path 78 due to the biasing force provided by the valve spring 84. The first and the second oil paths 78 and 87 are no longer in fluid communication with each other. Because the oil is now trapped in the oil pressure cylinder 95, the connecting plate 92 and the hook 93 are biased toward the rear of the handle 70 thus maintaining a tight grip of the upper rim 205 of the cooking utensil.

To release the detachable handle 70 from the cooking utensil, the user simply needs to depress the releasing button 72. When the releasing button 72 is depressed, the lever 85 is pivotted which in turn allows the valve stem 79 to be displaced upwardly to ascend the O-rings 81 attached to the circumference of the valve stem 79. Then, the first and the second oil paths 78 and 87 are once again in fluid communication with each other, thereby transferring the oil in the oil pressure cylinder 95 to the oil pressure pump 75. The shifting of the oil from the oil pressure cylinder 95 to the oil pressure pump 75 retracts the piston rod 91 into the oil pressure cylinder 95. As a result, the hook 93 moves away from the upper rim 205 of the cooking utensil, thus releasing it.

In the preferred embodiment, various chambers are provided in the handle body 50 to receive the oil pressure pump 75, the control valve chamber 83, the oil pressure cylinder 95 and the actuator assembly. The first and the second oil paths 78 and 87 may be provided by preparing conduits in the body 50. Alternatively, the first and the second oil paths 78 and 87 may be provided by using hoses or other methods known to one of ordinary skill in the art.

The scope of the present invention is not limited to the handle to be coupled with pots or frying pans but may also be used with other apparatus or containers.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and equivalents.

What is claimed is:

1. A detachable handle for a container having an upper rim, the handle comprising:
 a body having a front portion and including:
  a pressure pump actuated with a first control button, wherein the pressure pump includes a first piston and contains viscous fluid;
  a control valve chamber in fluid communication with the pressure pump through a first fluid path, the control valve chamber including a control valve being actuated with a second control button;
  a pressure cylinder in fluid communication with the control valve chamber through a second fluid path, wherein the pressure cylinder includes a second piston; and
  an actuating assembly connected to the second piston, wherein the actuating assembly includes a hook extending out of the body for engaging the upper rim of the container.

2. The detachable handle of claim 1, wherein when the first control button is depressed, the viscous fluid is transferred from the pressure pump to the control valve chamber through the first fluid path and into the pressure cylinder through the second fluid path.

3. The detachable handle of claim 1, wherein when the second control button is depressed, the viscous fluid is transferred from the pressure cylinder to the control valve chamber through the second fluid path and to the pressure pump through the first fluid path.

4. The detachable handle of claim 1, further comprising a first spring disposed inside the control valve chamber to bias the control valve to block the flow of the viscous fluid from being transferred from the control valve chamber to the pressure pump.

5. The detachable handle of claim 1, further comprising a second spring disposed inside the pressure cylinder to bias the actuating assembly connected to the second piston to disengage the container.

6. The detachable handle of claim 1, wherein the front portion of the handle has a step-like configuration for receiving therein a flange of the container.

7. The detachable handle of claim 1, wherein the viscous fluid is oil.

8. The detachable handle of claim 1, wherein the pressure cylinder is laterally disposed within the handle so that the second piston moves laterally to allow the hook to move forward and backward with respect to the handle.

9. The detachable handle of claim 1, wherein the pressure pump is longitudinally disposed within the handle.

10. The detachable handle of claim 1, wherein the front portion of the handle is at least partially covered with a support plate to prevent erosion after a prolonged use.

11. The detachable handle of claim 2, wherein when the second control button is depressed, the viscous fluid is transferred from the pressure cylinder to the control valve chamber through the second fluid path and to the pressure pump through the first fluid path.

12. The detachable handle of claim 2, further comprising a first spring disposed inside the control valve chamber to bias the control valve to block the flow of the viscous fluid from being transferred from the control valve chamber to the pressure pump.

13. The detachable handle of claim 2, further comprising a second spring disposed inside the pressure cylinder to bias the actuating assembly connected to the second piston to disengage the container.

14. A detachable handle for a container having an upper rim, the handle comprising:
   a body having a front portion and including:
      a pressure pump actuated with a first control button, wherein the pressure pump includes a first piston and contains viscous fluid;
      a pressure cylinder in fluid communication with the pressure pump through a fluid path, wherein the pressure cylinder includes a second piston; and
      an actuating assembly connected to the second piston, wherein the actuating assembly includes a hook extending out of the body for engaging the upper rim of the container.

15. The detachable handle of claim 14, further comprising a control valve chamber in fluid communication with the pressure pump and the pressure cylinder to control the flow of the viscous fluid in the fluid path.

16. The detachable handle of claim 14, wherein when the first control button is depressed, the viscous fluid is transferred from the pressure pump to the pressure cylinder through the fluid path.

17. The detachable handle of claim 15, wherein when the first control button is depressed, the viscous fluid is transferred from the pressure pump to the pressure cylinder through the fluid path.

18. A cooking utensil comprising:
   a container having an upper rim; and
   a detachable handle comprising:
      a body having a front portion and including
         a pressure pump actuated with a first control button, wherein the pressure pump includes a first piston and contains viscous fluid;
         a control valve chamber in fluid communication with the pressure pump through a first fluid path, the control valve chamber including a control valve being actuated with a second control button;
         a pressure cylinder in fluid communication with the control valve chamber through a second fluid path, wherein the pressure cylinder includes a second piston; and
         an actuating assembly connected to the second piston, wherein the actuating assembly includes a hook extending out of the body for engaging the upper rim of the container.

19. The cooking utensil of claim 18, wherein when the first control button is depressed, the viscous fluid is transferred from the pressure pump to the control valve chamber through the first fluid path and into the pressure cylinder through the second fluid path.

20. The cooking utensil of claim 18, wherein when the second control button is depressed, the viscous fluid is transferred from the pressure cylinder to the control valve chamber through the second fluid path and to the pressure pump through the first fluid path.

* * * * *